US011939205B1

(12) United States Patent
Reid et al.

(10) Patent No.: US 11,939,205 B1
(45) Date of Patent: Mar. 26, 2024

(54) PORTABLE BEVERAGE APPARATUS

(71) Applicants: Randy Reid, Brampton (CA); Gary Harper, Brampton (CA); Dean Samuels, Scarborough (CA)

(72) Inventors: Randy Reid, Brampton (CA); Gary Harper, Brampton (CA); Dean Samuels, Scarborough (CA)

( * ) Notice: Subject to any disclaimer, the term of this patent is extended or adjusted under 35 U.S.C. 154(b) by 0 days.

(21) Appl. No.: 17/931,161

(22) Filed: Sep. 12, 2022

(51) Int. Cl.
*B67D 3/00* (2006.01)

(52) U.S. Cl.
CPC ......... *B67D 3/0035* (2013.01); *B67D 3/0083* (2013.01)

(58) Field of Classification Search
CPC ............ B67D 2210/00133; B67D 3/00; B67D 2210/00128; B67D 3/02; B67D 3/009; B67D 3/0087; B67D 3/0083; B67D 3/008; B67D 3/0035; B67D 3/0029
See application file for complete search history.

(56) References Cited

U.S. PATENT DOCUMENTS 1,772,111 A * 8/1930 Rice ..................... B67D 1/0857 222/173
2,711,268 A * 6/1955 Cannella .................. B67D 3/00 137/261
5,351,861 A * 10/1994 Jovellana ............... B67D 3/043 222/144
2006/0283883 A1* 12/2006 Mika .................... B67D 3/0009 222/129
2007/0051753 A1* 3/2007 Lu ........................ B67D 3/0054 222/476
2012/0067921 A1* 3/2012 Shippen ............... B67D 3/0083 222/144

* cited by examiner

*Primary Examiner* — Patrick M. Buechner
(74) *Attorney, Agent, or Firm* — Orin Del Vecchio

(57) ABSTRACT

A portable beverage apparatus that is configured to store a plurality of bottles in a position for dispensing liquid therefrom and wherein the present invention further includes storage for additional beverage receptacles. The present invention includes an annular base support member having a lower storage container superposed thereto. The lower storage container is configured to receive and store beverage containers of various sizes. A support mast member extends upward from the lower end of the portable beverage apparatus to the upper end thereof. A beverage dispensing assembly is rotatably mounted about the support mast member. The beverage dispensing assembly is configured to receive and retain a plurality of bottles in an inverted position providing access to the contents of the bottle through valve assemblies. An upper tray member is located at the top of the beverage dispensing assembly and is configured to receive and store alternate types of beverage containers.

14 Claims, 2 Drawing Sheets

PORTABLE BEVERAGE APPARATUS

FIELD OF THE INVENTION

The present invention relates generally to beverage storage and dispensing apparatus, more specifically but not by way of limitation, portable beverage apparatus that is configured to provide both storage of a plurality of alternate types of beverage receptacles as well as provide dispensing of beverages that are stored in bottles.

BACKGROUND

As is known in the art, there are a plurality of alternate fixtures and installations that can be utilized to store and serve beverages both in commercial and residential environments. Commercial facilities such as bars and restaurants employ, the utilization of dedicated bar space, specialized coolers and other items to store, prepare and dispense beverages. These items can be manually operated by an individual or be an automated machine. While the aforementioned functions well in commercial environments, this type of equipment is not very suitable to be deployed in smaller environments such as but not limited to residential environments.

One issue with smaller environments such as but not limited to residential environments is the available space for some or all of the aforementioned equipment. The vast majority of homes do not have the space for dedicated bar equipment. Furthermore, this equipment can he quite costly and is also expensive to operate and maintain. While smaller bars and equipment are available, conventional equipment are bar carts and the like which either have an undesirable ornamental appearance and further lack some needed elements in order to execute a plurality of functional tasks associated with beverage storage and dispensing.

It is intended within the scope of the present invention to provide a portable beverage apparatus that is configured to have beverage containers operably coupled thereto and dispense liquid therefrom and further provide storage of a plurality of alternate types of beverage containers.

SUMMARY OF THE INVENTION

It is the object of the present invention to provide a portable beverage apparatus that is configured to provide storage of a plurality of beverage receptacles wherein the present invention includes a base support member wherein the base support member is superposed a support surface such as but not limited to a floor and further configured to be movable thereacross.

Another object of the present invention is to provide a beverage dispensing and storage device that is configured to be portable wherein the present invention includes a lower storage container wherein the lower storage container is superposed the upper surface of the base support member.

Yet another object of the present invention is to provide a portable beverage apparatus that is configured to provide storage of a plurality of beverage receptacles wherein the present invention further includes a support mast member wherein the support mast member extends upward from said base support member to the upper end of the portable beverage apparatus.

A further object of the present invention is to provide a beverage dispensing and storage device that is configured to be portable that further includes a beverage dispensing assembly wherein the beverage dispensing assembly is rotatably mounted to the support mast member.

Still another object of the present invention is to provide a portable beverage apparatus that is configured to provide storage of a plurality of beverage receptacles wherein the beverage dispensing assembly has a lower tray member therebeneath.

An additional object of the present invention is to provide a beverage dispensing and storage device that is configured to be portable wherein the present invention further includes a plurality of support members intermediate the lower storage container and the lower tray member.

Yet a further object of the present invention is to provide a portable beverage apparatus that is configured to provide storage of a plurality of beverage receptacles wherein the beverage dispensing assembly is configured to have beverage bottles operably coupled thereto for dispensing of the liquid disposed therein.

Another object of the present invention is to provide a beverage dispensing and storage device that is configured to be portable wherein the present invention further includes an upper tray member operably coupled to the support mast member above the beverage dispensing assembly.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
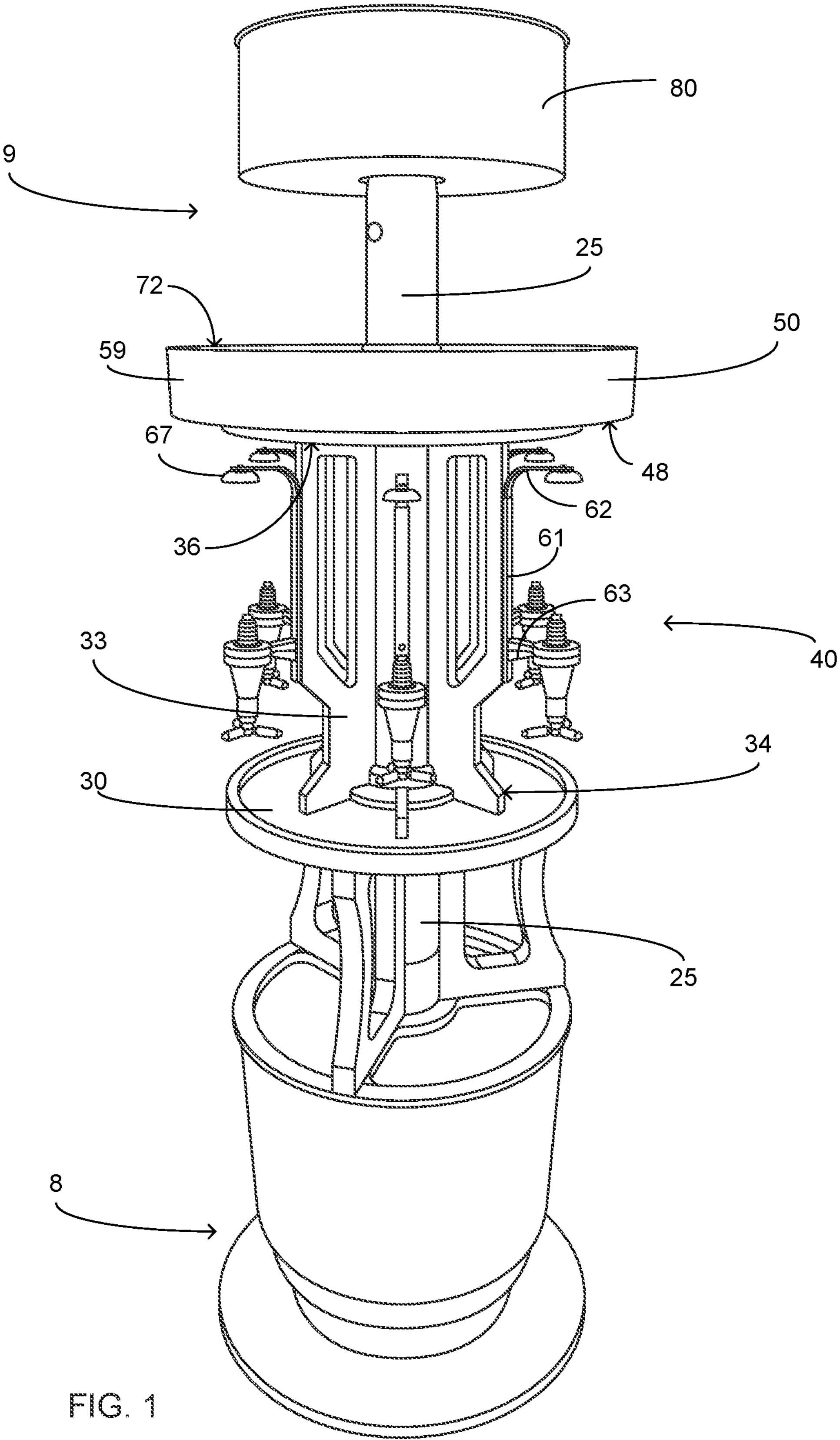
FIG. 1 is a perspective view of the present invention.
Figure 2:
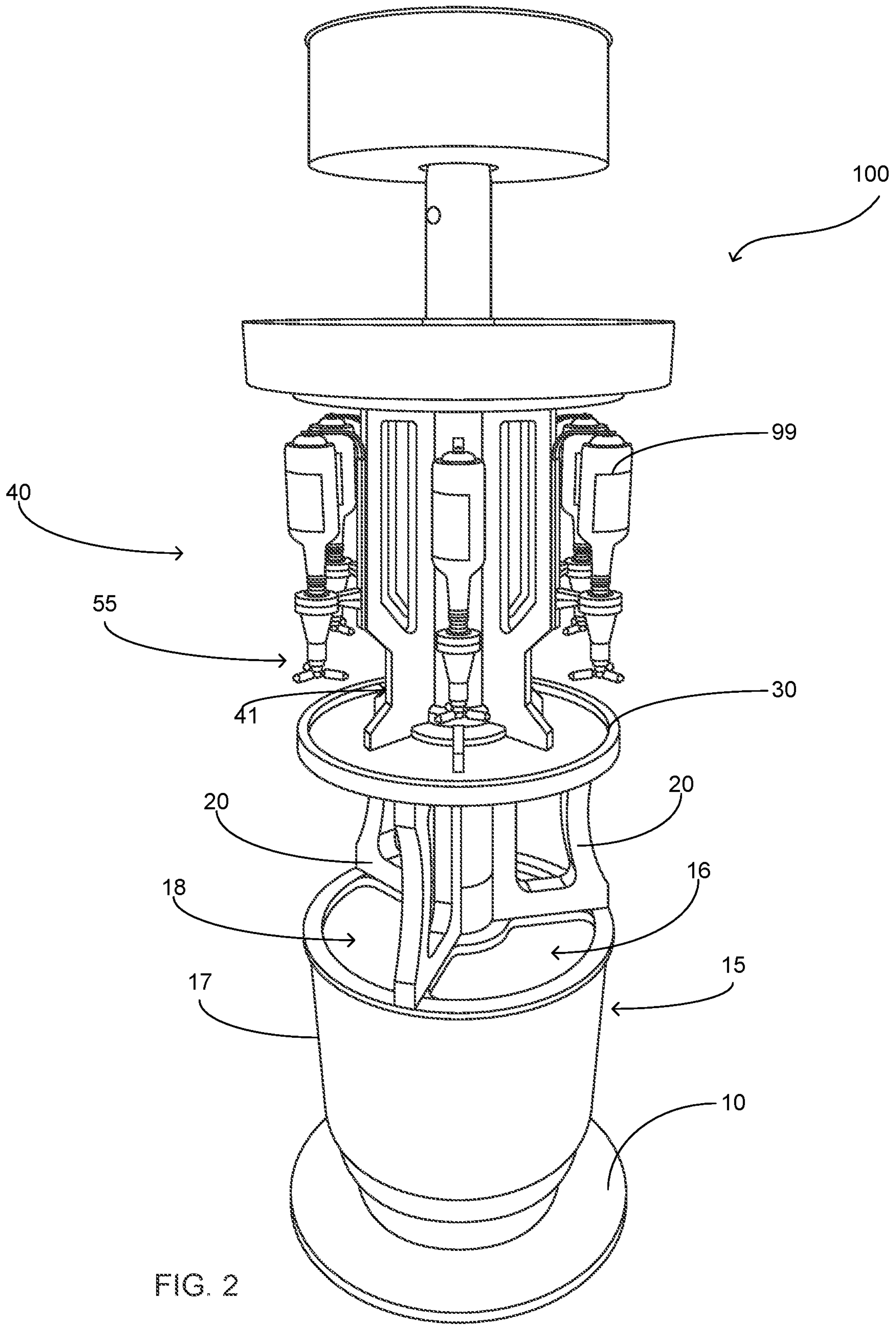
FIG. 2 is a perspective view of the present invention with beverage bottles mounted in the beverage dispensing assembly.

Referring now to the drawings submitted herewith, wherein various elements depicted therein are not necessarily drawn to scale and wherein through the views and figures like elements are referenced with identical reference numerals, there is illustrated a portable beverage apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the drawing submitted herewith, the portable beverage apparatus 100 in a preferred embodiment is manufactured from metal or other durable lightweight material. While no particular size is required good results for a floor model are approximately six feet in height. It should be understood within the scope of the present invention that alternate embodiments are contemplated within the scope of the present invention such as but not limited to embodiments that are sized for alternate areas such as but not limited to floors and tabletops. It should be further understood within the scope of the present invention that the rotational movement of some elements discussed herein could be manual or electric. Additionally, it should be understood within the scope of the present invention that the portable beverage apparatus 100 could be equipped with lights in various portions thereof.

The portable beverage apparatus 100 includes a base support member 10. The base support member 10 is annular in shape and is configured to be superposed a floor. While not particularly illustrated herein, it is desired within the preferred embodiment of the present invention that the base support member 10 be equipped with wheels or similar element so as to enable movement of the portable beverage apparatus 100 to a desired location. It should be understood within the scope of the present invention that the base support member 10 could be provided in various diameters and it should be further understood that the base support member 10 could be provided in alternate shapes.

Superposed the base support member 10 is the lower storage container 15. The lower storage container 15 includes an interior volume 16 and is operable to receive and store beverage receptacles of various sizes. It should be further understood that the lower storage container 15 is configured to receive ice in conjunction with the beverage receptacles and as such have any necessary drain apertures (not illustrated herein) so as to accommodate removal of any liquid. The lower storage container 15 includes a wall 17 defining the shape thereof and further includes openings 18 intermediate the support members 20. While not particularly illustrated herein, it should be understood within the scope of the present invention that the openings 18 could have removable lids placed thereon. It should be further understood within the scope of the present invention that the lower storage container 15 could be configured with a conventional refrigeration unit so as to maintain a desired temperature for the interior volume 16.

The portable beverage apparatus 100 includes a support mast member 25 wherein the support mast member 25 is the primary vertical structural support member for the portable beverage apparatus 100. The support mast member 25 extends from the bottom end 8 of the portable beverage apparatus 100 to the upper end 9. The elements such as but not limited to the lower storage container 15, beverage dispensing assembly 40 and top member 80 are operably coupled to the support mast member 25 utilizing suitable techniques. Three support members 20 are operably coupled to the support mast member 25 and extend outward therefrom. The support members 20 are superposed the top of the lower storage container 15 and are further operably coupled to the bottom of the lower tray member 30 utilizing suitable techniques. The support members 20 provide improved lateral stability for the beverage dispensing assembly 40 and the weight thereof ensuing coupling of the exemplary beverage bottles 99.

The beverage dispensing assembly 40 is configured to facilitate presentation, storage and dispensing of a beverage from operably coupled beverage bottles 99. The beverage dispensing assembly 40 includes a lower tray member 30 having vertical support members 33 extending upwards therefrom. The vertical support members 33 include lower end 34 and upper end 36 wherein upper end 36 is secured to bottom 48 of upper tray member 50. The vertical support members 33 are spaced approximately in a one hundred and twenty degree pattern around the support mast member 25 so as to provide the desired support and offer multiple openings 18 for the lower storage container 15. While a desired arrangement of the vertical support members 33 are illustrated herein, it is contemplated within the scope of the present invention that the vertical support members 33 could be provided in alternate styles and arrangements in order to achieve the desired objective stated herein. The lower end 34 of the vertical support members 33 have formed therein inset 41. Inset 41 provides clearance and access for a vessel such as but not limited to a glass so as to facilitate the vessel being placed underneath the valve assembly 55. A bottle support member 61 is secured to the vertical support member 33 utilizing suitable techniques and is configured to receive and store a bottle 99 in an inverted position. The bottle support member 61 includes upper section 62 contiguously formed therewith being perpendicular thereto. Lower section 63 extends outward from the bottle support member 61 and is configured to be operably coupled to the valve assembly 55 providing support thereof. Upper section 62 further includes keeper 67 wherein keeper 67 is configured to operably couple to the bottom of bottle 99 to ensure maintenance of the position thereof ensuing being secured in an inverted position in the beverage dispensing assembly 40. The valve assembly 55 is a conventional one-way valve that facilitates flow of liquid stored in the bottle 99 outward therefrom. The beverage dispensing assembly 40 is rotatably mounted to the support mast member 25 utilizing suitable techniques. Rotatable mounting of the beverage dispensing assembly 40 facilitates positioning and access to a desired bottle 99 for access to the contents thereof. While a rotating beverage dispensing assembly 40 is desired in the preferred embodiment of the portable beverage apparatus 100, it is contemplated within the scope of the present invention that the beverage dispensing assembly 40 could be statically mounted to the support mast member 25. While in a preferred embodiment the portable beverage apparatus 100 is configured to have a capacity for six bottles, it should be understood within the scope of the present invention that the portable beverage apparatus 100 could be configured to have less than or more than six bottles in the beverage dispensing assembly 40.

The upper tray member 50 is surroundably mounted to the support mast member 25 at the upper end of the beverage dispensing assembly 40. The upper tray member 50 includes wall 59 formed with bottom 48 to create interior volume 72. The upper tray member 50 is operable to have beverage receptacles and ice stored in the interior volume 72 thereof. As with the lower storage container 15, it should be understood within the scope of the present invention that the upper tray member 50 could be configured with a drain aperture or other element so as to facilitate the removal of liquid. While the upper tray member 50 is illustrated herein as being annular in shape it should be understood within the scope of the present invention that the upper tray member 50 could be provided in alternate shapes and sizes. Located above the upper tray member 50 is top member 80. Top member 80 is secured to the upper end of the support mast member 25 utilizing suitable techniques. Top member 80 is annular in shape having a diameter less than that of the upper tray member 50. It is contemplated within the scope of the present invention that the top member 80 could be provided in alternate sizes and shapes. It should be further understood within the scope of the present invention that the top member 80 could be equipped with conventional LED lighting.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A portable beverage apparatus that is configured to store a plurality of alternate types of beverage containers and facilitate dispensing from at least one of the alternate types of beverage containers wherein the portable beverage apparatus comprises:

a base support member, said base support member located at a lower end of the portable beverage apparatus, said base support member configured to transport the portable beverage apparatus, said base support member having an upper surface;

a lower storage container, said lower storage container having at least one wall defining a shape thereof, said lower storage container having an interior volume, said lower storage container having at least one opening providing access to said interior volume;

a support mast member, said support mast member extending upward from the lower end of the portable beverage apparatus, said support mast member providing vertical structural support for the portable beverage apparatus;

a beverage dispensing assembly, said beverage dispensing assembly being mounted about said support mast member, said beverage dispensing assembly configured to receive and store at least one beverage container in an inverted position; and wherein the beverage dispensing assembly includes a valve configured to dispense contents of the at least one beverage container into a vessel.

2. The portable beverage apparatus as recited in claim 1, and further including an upper tray member, said upper tray member being proximate an upper end of the beverage dispensing assembly, said upper tray member configured to receive and retain beverage containers.

3. The portable beverage apparatus as recited in claim 2, and further including a lower tray member, said lower tray member being proximate a lower end of the beverage dispensing assembly, said lower tray member being annular in shape and configured to encompass the support mast member.

4. The portable beverage apparatus as recited in claim 3, wherein the beverage dispensing assembly further includes at least one vertical support member, said at least one vertical support member being intermediate said lower tray member and said upper tray member.

5. The portable beverage apparatus as recited in claim 4, wherein said beverage dispensing assembly further includes at least one bottle support member, said at least one bottle support member being operably coupled to the at least one vertical support member, said at least one bottle support member further having an upper section and a lower section being contiguous with and perpendicular to a center section.

6. The portable beverage apparatus as recited in claim 5, wherein said upper section of the at least one bottle member further includes a keeper operably coupled thereto, said keeper configured to engage a bottom of a beverage container.

7. The portable beverage apparatus as recited in claim 6, wherein the at least one vertical support member includes an inset, said inset being formed proximate a lower end thereof adjacent the valve, said inset configured to provide accommodation for a glass to be placed under said valve.

8. A portable beverage apparatus that is configured to store a plurality of alternate types of beverage containers wherein one type of the beverage container is stored in an inverted position so as to facilitate dispensing of contents therefrom wherein the portable beverage apparatus comprises:

a base support member, said base support member located at a lower end of the portable beverage apparatus, said base support member being annular in shape, said base support member configured to transport the portable beverage apparatus, said base support member having an upper surface;

a lower storage container, said lower storage container having a wall, said lower storage container having a lower end and an upper end, said lower storage container having an interior volume, said lower storage container having three openings providing access to said interior volume;

a support mast member, said support mast member extending upward from the lower end of the portable beverage apparatus, said support mast member providing vertical structural support for the portable beverage apparatus;

a beverage dispensing assembly, said beverage dispensing assembly being mounted rotatably mounted and surrounding said support mast member, said beverage dispensing assembly configured to receive and store a plurality of beverage bottles in an inverted position, said beverage dispensing assembly further including a lower tray member and an upper tray member, said beverage dispensing assembly further including a plurality of vertical support members, said plurality of vertical support members extending intermediate said lower tray member and said upper tray member being operably coupled therewith, said plurality of vertical support members having a bottle support member operably coupled thereto, said bottle support member having a center section, an upper section and lower section wherein said upper section and said lower section are perpendicular to said center section being contiguous therewith; and wherein the bottle support members have a valve coupled to the lower section thereof wherein the valve is operable to dispense contents of the beverage bottles into a glass.

9. The portable beverage apparatus as recited in claim 8, wherein the plurality of vertical support members further include an inset formed at a lower end thereof, said inset being proximate said valve, said inset configured to accommodate a glass placement underneath said valve.

10. The portable beverage apparatus as recited in claim 9, and further including three support members, said three support members being intermediate the upper end of the lower storage container and a bottom surface of the lower tray member being operably coupled therewith.

11. The portable beverage apparatus as recited in claim 10, wherein the three support members are positioned about said support mast member having approximately one hundred and twenty degrees therebetween.

12. The portable beverage apparatus as recited in claim 11, wherein the three openings of the lower storage container are intermediate the three support members.

13. The portable beverage apparatus as recited in claim 12, and further including a top member, said top member being secured proximate an upper end of the portable beverage apparatus, said top member being annular in shape.

14. The portable beverage apparatus as recited in claim 13, wherein the upper tray member includes a wall defining an interior volume configured to retain beverage containers therein.

* * * * *